United States Patent Office 3,351,614
Patented Nov. 7, 1967

3,351,614
PROCESS FOR THE ESTERIFICATION OF POLYOXYMETHYLENES
Leonardo Fiore, Milan, and Vittorio Tablino Possio, Busto Arsizio, Varese, Italy, assignors to Montecatini Edison S.p.A., Milan, Italy
No Drawing. Filed July 26, 1963, Ser. No. 298,527
Claims priority, application Italy, July 27, 1962, 15,193/62
7 Claims. (Cl. 260—67)

This invention relates to the esterification of the terminal hydroxyl groups of high polymers of formaldehyde by reaction with anhydrides of carboxylic acid in the presence of specific compounds which make it possible to obtain products having a high thermal stability and which are free of discoloring.

It is known that high molecular weight polymers of formaldehyde can be obtained in various ways such as, for example, by polymerization of anhydrous formaldehyde, of formaldehyde in aqueous solution and of trioxane. At high temperatures, however, these polymers decompose and yield the starting formaldehyde.

The structure of these polymers, in general referred to as polyoxymethylene hydroxides, corresponds to the following formula:

$$R(OCH_2)_n\text{—}OH$$

wherein R is either H or any group introduced in the polymerization stage as a chain initiator, chain terminator or chain transfer agent.

It is known that, in order to increase the stability of polyoxymethylene hydroxides, the terminal hydroxyls are blocked by esterification or etherification. One of the methods studied most is esterification which is carried out by treating the polymer at high temperatures with an anhydride of a carboxylic acid.

The basic work on the esterification of polyoxymethylene with acetic anhydride goes back to Staudinger (Ann. 474, 195–1957 (1923)); Die Hochmolekularen Verbindungen (1932). More recently, it was found that it is useful to employ normal acetylation catalysts such as sodium acetate; pyridine, etc. See U.S. Patents 2,964,520 and 2,998,409.

A variety of operating conditions have been suggested. For example, the operation may take place with or without a solvent in the heterogeneous phase or in solution with a liquid anhydride or in the vapor phase, at temperatures ranging from 50 to 200° C.

In general, however, it is preferred to operate at a temperature ranging from 120 to 160° C., in the presence of catalysts. These temperatures are sufficiently high to assure good acetylation. At higher temperatures, side reactions take place which cause discoloring and decomposition of the polymer. Under these conditions, the process is carried out in the heterogeneous phase since the polymer, at temperatures of 120° and 160° C., remains in the solid state and the anhydride in the liquid or vapor state depending on the temperature and pressure used.

All the polyoxymethylenes prepared from anhydrous formaldehyde, which are characterized by a relatively low crystallinity, e.g., lower than 80%, are easily acetylated in the heterogeneous phase at temperatures ranging from 120° to 160° C. There are, however, some polyoxymethylenes with high crystallinity, about 90% and above, which are prepared from aqueous formaldehyde solutions or from trioxane, which under these conditions are partially acetylated and have, therefore, a poor thermal stability (see Italian patent application No. 9,962, filed on Jan. 27, 1961).

In Table I acetylation tests on both low and high crystallinity polyoxymethylenes, prepared in various ways, are reported for the purpose of comparison.

As an indication of the degree of acetylation, the table reports loss of weight of the polymer due to heating in air at 200° C. for 30 minutes and gives samples which have been treated with a thermal stabilizer and an antioxidant which are needed to avoid the degradation side-reactions of the acetylated polyoxymethylenes at temperatures of about 200° C.

The test conditions and stabilizers used are specified hereinbelow. From the data reported in Table I, it is evident that highly crystalline polyoxymethylenes can be acetylated only with great difficulty. However, polyoxymethylene (A), having a crystallinity of 72%, is easily acetylated at 130° C. as indicated by the improvement in the thermal stability. Polyoxymethylenes (B) and (C), having a high crystallinity and acetylated at 130–160° C., show a poor thermal stability, even though the starting products were improved. At the temperatures used, the increase in the acetylation time or the addition of acetylation catalysts did not substantially improve the stability of the polyoxymethylenes.

The high crystallinity polymers reach high thermal stabilities only by acetylation at 180° C., more specifically, at temperatures at which the polymer is completely dissolved in the acetylating mixture.

In order to explain the difference in behavior, it should be pointed out that there is no substantial difference between the polyoxymethylenes examined with respect to the composition and the structure of the polymeric chains. The crystallinity potential is the same in each of the polyoxymethylenes; the differences in the percent crystallinity as determined by X-ray examination depend only on the different rates of formation of the crystal lattice.

It is known that with polymers having a regular structure, the X-ray crystallinity can be varied highly by varying the crystallization rate. Since the synthesis of polyoxymethylenes by known methods always takes place with the separation of the polymer in the solid state, the crystallization rate practically coincides with the growth rate of the chains and, therefore, the lower the polymerization kinetics, the higher the crystallinity of the polymer. As a confirmation of this, it should be noted that if the various polyoxymethylenes prepared by different methods and having a different percent crystallinity are melted or dissolved in a solvent and are then recrystallized under the same conditions, they present practically the same crystallinity as observed from the data reported in Table II. These considerations make it possible to explain the behavior of the different polyoxymethylenes with respect to acetylation.

The difficulties of acetylating the highly crystalline polymers, as indicated by the data reported in Table I, does not depend on the different chemical reactivity of the chain terminals but only on the difficulty of penetration of acetic anhydride into the crystalline aggregates. In order to obtain complete acetylation of these polymers, it is, therefore, necessary to destroy their crystalline structure by heating them above their solubility temperature.

The acetylation of polyoxymethylenes at high temperatures, however, presents problems. It has in fact been observed that the usual acetylation catalysts such as sodium acetate, pyridine, etc., do not favor the acetylation reaction and are detrimental in that they cause intense discoloring in the acetylating mixtures. The acetylated polymers thus obtained have a yellow-brown color even after sufficient washing with various solvents. In the absence of these acetylation catalysts, the discoloring is less intense, but, nevertheless, is always present and the polymer must be washed repeatedly with solvents in order to improve its appearance. Moreover, during the acetylation reaction, partial splitting of the polyacetic chains is possible, which splitting reduces, sometimes in a remarkable manner, the average molecular weight of the acetylated polymer.

It has now been discovered that by adding certain stabilizing agents to the acetylating mixture it is possible to prevent discoloring and to reduce the splitting of the polyacetalic chains even at temperatures of 180° C. and above. These agents include such compounds as urea; thiourea; substitutedureas, e.g., methyl, ethyl, propyl, butyl, phenyl, dimethyl, diethyl, etc.; biuret; polyurets; carbamates, e.g., methyl, ethyl, propyl, butyl, amyl, N-phenylethylcarbamate; allophanates, e.g., methyl, ethyl, butyl, amyl, phenyl, tolylallophanate; cyanuric acid; barbituric acid; and diketopiperazines, e.g., 2,5-diketopiperazine, 1,4-dimethyl 2,5-diketopiperazine, 1-phenyl-2,5-diketopiperazine, 1,4-diphenyl-2,5-diketopiperazine.

An object of this present invention is to provide a method of esterifying polyoxymethylenes with anhydrides of carboxylic acid which makes it possible to prevent discoloring of the polymer due to side reactions and to avoid the splitting of the polymeric chains during the reaction. This method is particularly suitable for highly crystalline polyoxymethylenes, which, in order to react completely, require high temperatures to obtain complete dissolution in the esterifying mixture.

According to the process of this invention, the stabilizing agents are added in concentrations ranging from 0.002 to 2% by weight of the anhydride. These agents include compounds which are considered derivatives of carbonic or thiocarbonic acid, with nitro-containing substituents in place of the hydroxyls. These compounds can be represented by the following formulae:

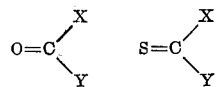

wherein X and Y, which can be either same or different, are selected from the groups consisting of —NH$_2$, —NHR, —NHR$_1$R$_2$, —NH—COR,
—NH—CO—OR, —NH—CO—NH$_2$,
NO—CO—NHR, and —NH—CO—NR$_1$R$_2$—OR wherein R, R$_1$ and R$_2$ are alkyl, cycloalkyl or aryl groups, such as methyl, ethyl, propyl, butyl, amyl, cyclohexyl or phenyl. Examples of these compounds include urea, thiourea, substituted urea, biuret, triuret, carbamates, allophanates and cyclic compounds wherein the ring contains two or more —CONH or CS—NH groups, for example cyanuric acid, barbituric acid, diketopiperazine, etc.

Powdered polyoxymethylenes may be dispersed in 1–20 parts of the esterifying solution containing a compound selected from those mentioned in concentrations from 0.002 to 2% by weight based on the weight of the anhydride. Typical solvents include pentane, hexane, heptane, benzene, toluene, cyclohexane, etc.

The suspension was heated rapidly to obtain complete dissolution of the polyoxymethylene, to a temperature between 170 and 210° C.

As soon as the polymer is dissolved, the temperature of the solution may be lowered without precipitation by heating the suspension of crystalline polyoxymethylene in pure acetic anhydride. The polymer is completely dissolved between 170 and 180° C. If the solution obtained is then cooled, the polymer begins to precipitate between 130 and 135° C.

It is obvious, therefore, that, as soon as the polymer is dissolved, the reaction can proceed in solution at lower temperatures, between the solubility temperature and the temperature at which crystallization of the polymer begins. At the end of the reaction, which is carried out at temperatures preferably between 135 and 210° C., the solution is cooled and the crystallized polymer is separated by filtration and dried.

In Table III the results of the acetylation tests in solution with acetic anhydride are reported.

These tests show that by operating without an additive, but in the presence of an acetylation catalyst such as sodium acetate or pyridine, acetic anhydride, at the end of the reaction, is colored. These colors can not be removed from the polymer even after repeated washings. On the contrary, by operating with the additives which are the subject of this invention, the acetic anhydrides and the polymer separated therefrom were completely free of colors. Moreover, in the presence of these additives, the acetylated polymer appeared to have a remarkably higher inherent viscosity. The action of the compounds of this invention is not completely understood. It can be assumed, however, that they have an inhibiting action on the side reactions occurring in the esterification process. These compounds, by reacting with the side-reaction products prevent the formation of colored products and the splitting of polyacetalic chains.

It is known that a high temperature treatment of the anhydrides of carboxylic acids will lead to a pyrolysis reaction which results in the formation of compounds of a ketenic nature which, through successive reactions, give various colors to the reaction medium. It is also known that during the esterification reaction the hydroxyl groups with the anhydrides, acid compounds are formed which, in turn, cause acidolytic splitting of the polyacetalic chains.

The compounds or stabilizing agents of this invention, by reacting with the aforementioned substances, will transform them into colorless and inactive products.

For esterification of the terminal hydroxyls of the molecular chains, in addition to acetic anhydride, other anhydrides of carboxylic acids can be used. These include such compounds as propionic, butyric, capronic, benzoic and phthalic anhydrides, and also the anhydrides of acids having 2–18 carbon atoms. These anhydrides can be used alone or in admixture with inert organic solvents such as the aliphatic or aromatic hydrocarbons.

The following examples illustrate the invention without intending to limit its scope.

The methods used for determining the characteristics of the polymer were as follows:

(a) In inherent viscosity, defined as

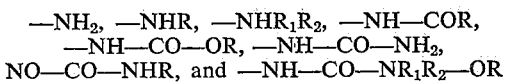

wherein C=the concentration of the solute in g./100 cc. of the solvent, and $$\text{relative viscosity} = \frac{\text{viscosity of the solution}}{\text{viscosity of the solvent}}$$

the latter being determined at 150° C., with dimethylformamide as the solvent, a polymer concentration of 0.5 g./100 cc. of solvent, and with the addition of 1% of diphenylamine as the antioxidant.

(b) Thermal stability at 200° C., defined by the percent weight loss of the polymer after being heated at that temperature for 30 minutes. In determination (b) a suitable oven was used in which the test tubes were placed, which contained 0.5 g. of the polymer previously mixed with 1% of the antioxidant, i.e., 4,4'-butylidene-bis-6-tert. butyl-3-methylphenol and 1% of a polyamide. The polyamide was a copolymer, soluble in alcohol, consisting of 40% of hexamethylene diamine adipate and 60% of ε-aminocaprolactam.

The addition was carried out by suspending the polymer in a methanol solution of the antioxidant and polyamide and then evaporating the solvent at 30° C. for three hours under a residual pressure of 20 mm. Hg.

(c) The X-rays crystallinity was determined according to the method described by C. F. Hammer, T. A. Kock and J. F. Whitney in J. of Appl. Polymer Science, vol. 11, n. 2, pp. 169–178 (1959).

EXAMPLES 1-4

A polyoxymethylene was prepared by polymerizing formaldehyde in an aqueous solution.

The characteristics of the polymer were as follows:

Crystallinity by X-ray examination: 100%.
Weight loss at 200° C. for 30 minutes: above 50%.
Inherent viscosity: could not be determined since the polymer was insoluble in dimethylformamide at 150° C.

In a 100 cc. Carius tube the following ingredients were placed in succession:

3 g. polyoxymethylene.
30 g. pure acetic anhydride (purity higher than 99.9%).

In a series of tests of this example, the compounds described in the following table were added:

| Example | Substance added | Grams |
|---|---|---|
| 1 | | |
| 2 | Sodium acetate | 0.06 |
| 3 | Pyridine | 0.06 |
| 4 | Urea | 0.06 |

After deaeration under vacuum and sealing under a flame, the tube was placed in an oil bath at 180° C. After about 1 minute, complete dissolution of the polymer was obtained and the solution was held in the bath for a total of 10 minutes.

After cooling and crystallization of the polymer, the vial was broken and acetic anhydride was removed by filtration. The polymer was washed many times with acetone and water and then dried in an oven at 70° C. for a few hours.

In Table III the esterification yields and the characteristics of the products treated are reported.

EXAMPLE 5

In a 100 cc. glass vial of the Carius type the following ingredients were placed:

3 g. of polyoxymethylene of the type described in the above example.
30 g. of 99.9% acetic anhydride.
0.06 g. of urea.

After de-aeration under vacuum and sealing in a flame, the vial was placed in an oil bath held at 180° C. After about 1 minute, complete dissolution of the polymer was obtained and the solution was held in the bath for a total of 30 minutes. The solution was then removed and cooled.

The anhydride was then eliminated by filtration and washing with acetone and water and the polymer was dried in an oven at 70° C. for several hours. The characteristics of the product are described in Table III.

EXAMPLE 6

The following substances were introduced into a 100 cc. glass vial:

3 g. of polyoxymethylene of the type described in the preceding examples.
30 g. of pure acetic anhydride.
0.06 g. of urea.

The vial, after de-aeration under vacuum and sealing in a flame, was immersed in an oil bath held at 180° C. in order to obtain the complete dissolution of the polymer. The vial was then quickly extracted and immersed into another bath held at 140° C. for 30 minutes more.

After cooling and crystallization, the polymer was separated from the anhydride as described in the preceding examples and was then dried at 70° C. for a few hours. The characteristics are reported in Table III.

EXAMPLE 7

The following ingredients were placed into a vial of the type described in the preceding examples:

3 g. of polyoxymethylene of the type described in the preceding examples.
30 g. of pure acetic anhydride.
0.15 g. of urea.

After de-aeration and sealing, the vial was immersed into an oil bath held at 180° C. By heating for 1 minute, complete dissolution of the polymer was obtained and the solution was held at the reaction temperature for a total of 10 minutes.

After cooling, crystallization of the polymer and filtration, washing and drying were carried out as described in the above examples.

The characteristics of the product are reported in Table III.

EXAMPLE 8

The following ingredients were placed into a vial of the type described in the preceding examples:

3 g. of polyoxymethylene of the type described in the preceding examples.
30 g. of 99.9% acetic anhydride.
0.06 g. of biuret.

After degasing and sealing, the vial was immersed into a bath at 180° C. After 1 minute, complete dissolution of the polymer was obtained and the reaction was continued for 9 minutes more. After cooling and filtration, the washing and drying were carried out as described in the preceding examples. The characteristics of the product are reported in Table III.

EXAMPLE 9

By operating as in the preceding examples, the following ingredients were placed in a vial:

3 g. of polyoxymethylene.
30 g. of pure acetic anhydride.
0.06 g. of phenyl urea.

The vial was held for 10 minutes in a bath at 180° C. to obtain solubilization of the polymer within 1 minute. The operations of filtration, washing and drying of the polymer were then carried out as described in the preceding examples. The characteristics of the product are reported in Table III.

EXAMPLE 10

The following ingredients were placed in a vial of the type described in the preceding examples:

3 g. of polyoxymethylene of the type described in the preceding examples.
30 g. of pure acetic anhydride.
0.06 g. of thiourea.

The esterification temperature was 180° C. for a total time of 10 minutes.

The successive operations on the polymer were carried out as in the preceding examples. The characteristics of the polymer are reported in Table III.

EXAMPLE 11

By operating as reported in the preceding examples, the following substances were placed in a vial:

3 g. of polyoxymethylene of the type described in the preceding examples.
30 g. of pure acetic anhydride.
0.06 g. of cyanuric acid.

The vial was held for 10 minutes in a thermostatic bath at 180° C. to obtain dissolution of the polymer after about 1 minute. The successive operations of filtration, washing and drying were carried out as described in Example 1.

The characteristics of the polymer are reported in Table III.

EXAMPLE 12

By operating as described in the preceding examples the following ingredients were placed in a vial:

3 g. of polyoxymethylene of the type described in the preceding examples.
10 g. of pure acetic anhydride.
0.06 g. of urea.
20 g. of pure anhydrous toluene.

The vial is held in a thermostatic bath at 180° C., to obtain dissolution of the polymer after 1–2 minutes. The operations of filtration, washing and drying were carried out as usual. A yield of acetylated polymer of 95% was obtained.

The preferred ratio of the polymer to the anhydrides ranges from about 1:0.5 to 1:2.

The thermal stability of the product obtained was substantially similar to that of the products described in the preceding examples.

TABLE I

[Acetylation tests with pure acetic anhydride on polyoxymethylenes with different degrees of crystallinity].

| Sample to be examined [1] | Crystallinity (percent) | Esterification temperature, ° C. | Time, minutes | Catalyst [2] percent by wt. of anhydride | Weight loss by thermal treatment at 200° C. in 30 minutes |
|---|---|---|---|---|---|
| A | 72 | | | | 66 |
| A | 72 | 130 | 30 | | 1 |
| B | 100 | | | | 58 |
| B | 100 | 130 | 30 | | 52 |
| C | 99 | | | | 52 |
| C | 99 | 130 | 30 | | 40 |
| C | 99 | 130 | 30 | 0.2 | 38 |
| C | 99 | 130 | 60 | 0.2 | 35 |
| C | 99 | 160 | 30 | 0.2 | 7 |
| C | 99 | 180 | 10 | | 1.1 |
| C | 99 | 180 | 30 | | 1.2 |

[1] Sample A was obtained by polymerization of anhydrous formaldehyde in toluene with triethylamine as the catalyst. Sample B was obtained by polymerization of trioxane with BF₃ etherate as the catalyst. Sample C was obtained by polymerization of formaldehyde in aqueous solution.
[2] Sodium acetate.

TABLE II

[Crystallinity of polyoxymethylenes prepared under different conditions before and after molding]

| | Crystallinity, percent [1] | |
|---|---|---|
| | Polymer as it is | Polymer molded at 200° C. |
| Polyoxymethylene obtained from anhydrous formaldehyde | 72 | 80 |
| Polyoxymethylene obtained from trioxane | 100 | 80 |
| Polyoxymethylene obtained from aqueous solutions | 99 | 80 |

[1] The crystallinity values were determined as described by C. F. Hammer, T. A. Koch and J. F. Whitney in J. of Applied Polymer Science, vol. 11, n. 2, pages 169–178 (1959).

While this invention has been described with a number of different examples, it is obvious that other variations and modifications may be resorted to without departing from the scope of the invention, except as recited in the appended claims.

What is claimed is:

1. A process for esterifying polyoxymethylene having a crystallinity of at least 90% which comprises esterifying the polyoxymethylene in a solution of an anhydride of a carboxylic acid at a temperature ranging from about 135° C. to 210° C. and in the presence of about 0.002 to 2.0% by weight of the anhydride of at least one stabilizing agent selected from the group consisting of urea, thiourea, substituted ureas, biuret, triuret, carbamates, allophanates, cyanuric acid, barbituric acid, and diketopiperazines.

2. The process of claim 1 wherein the polyoxymethylene is dissolved in the esterifying anhydride at a temperature ranging from about 170° C. to 210° C.

3. The method of claim 1 wherein the esterified polymer is crystallized at a temperature below 130° C.

4. The process of claim 1 wherein the anhydride is acetic anhydride.

5. The process of claim 4 wherein the acetic anhydride is diluted with an inert organic solvent selected from the group consisting of aliphatic, aromatic and cycloaliphatic hydrocarbons, esters, ethers, and ketones.

6. The process of claim 1 wherein the ratio of the polyoxymethylene to the anhydride of the carboxylic acid ranges from about 1:0.5 to 1:2.

TABLE III

[Acetylation tests on a polyoxymethylene with a crystallinity of 100% in acetic anhydride solution (acetic anhydride : polymer ratio by weight=1: 10)]

| Ex. | Additive | Conc.[1] | Solubilization temperature, ° C. | Reaction temperature, ° C. | Reaction time, minutes | Color of acetic anhydride after acetylation | Acetylation yield [2] | Inherent viscosity, dl./g. | Characteristics of the polymer Color | Characteristics of the polymer Weight loss at 200° C. for 30 minutes |
|---|---|---|---|---|---|---|---|---|---|---|
| 1 | | | 180 | 180 | 10 | Yellow | 97.0 | 0.61 | Slightly yellow | 1.1 |
| 2 | Sodium acetate | 0.2 | 180 | 180 | 10 | Intense yellow | 96.0 | 0.61 | Yellow | 1.1 |
| 3 | Pyridine | 0.2 | 180 | 180 | 10 | Dark brown | 95.0 | 0.61 | do | 1.2 |
| 4 | Urea | 0.2 | 180 | 180 | 10 | Colorless | 96.5 | 0.68 | White | 0.8 |
| 5 | do | 0.2 | 180 | 180 | 30 | do | 95.0 | 0.67 | do | 1.1 |
| 6 | do | 0.2 | 180 | 140 | 30 | do | 96.0 | 0.68 | do | 1.0 |
| 7 | do | 0.5 | 180 | 180 | 10 | do | 97.0 | 0.69 | do | 1.2 |
| 8 | Biuret | 0.2 | 180 | 180 | 10 | do | 94.0 | 0.70 | do | 0.9 |
| 9 | Phenylurea | 0.2 | 180 | 180 | 10 | do | 98.0 | 0.67 | do | 1.8 |
| 10 | Thiourea | 0.2 | 180 | 180 | 10 | do | 96.5 | 0.68 | do | 1.3 |
| 11 | Cyanuric acid | 0.2 | 180 | 180 | 10 | do | 97 | 0.66 | do | 1.1 |

[1] Referred to acetic anhydride and expressed as grams of additive per 100 g. of acetic anhydride.
[2] Expressed in grams of acetylated polymer per 100 g. of starting polymer.

7. The process of claim 1 wherein the polyoxymethylene to be esterified is obtained by the polymerization of formaldehyde in an aqueous medium.

References Cited

UNITED STATES PATENTS

| | | | |
|---|---|---|---|
| 2,893,972 | 7/1959 | Kubico et al. | 260—45.8 |
| 2,964,500 | 12/1960 | Jenkins et al. | 260—67 |
| 2,998,409 | 8/1961 | Nogare et al. | 260—67 |
| 3,000,861 | 9/1961 | Brown et al. | 260—67 |
| 3,125,551 | 3/1964 | Punderson | 260—67 |
| 3,219,630 | 11/1965 | Sidi | 260—67 |
| 3,226,366 | 12/1965 | Bezzi et al. | 260—67 |
| 3,232,906 | 2/1966 | Wagner | 260—67 |

WILLIAM H. SHORT, *Primary Examiner.*

SAMUEL H. BLECH, *Examiner.*

L. M. PHYNES, *Assistant Examiner.*

UNITED STATES PATENT OFFICE
CERTIFICATE OF CORRECTION

Patent No. 3,351,614　　　　　　　　　　　　　　November 7, 1967

Leonardo Fiore et al.

It is hereby certified that error appears in the above numbered patent requiring correction and that the said Letters Patent should read as corrected below.

Column 3, line 1, for "polyacetic" read -- polyacetalic --; column 4, line 44, for "In inherent" read -- Inherent --; line 45, for "in relative viscosity" read -- ln relative viscosity --.

Signed and sealed this 17th day of December 1968.

(SEAL)
Attest:

Edward M. Fletcher, Jr.　　　　　　　　　　　　EDWARD J. BRENNER
Attesting Officer　　　　　　　　　　　　　　　Commissioner of Patents